UNITED STATES PATENT OFFICE.

JOHN A. KASSEBAUM AND MATTHEW D. DARR, OF SALINA, KANSAS; SAID KASSEBAUM ASSIGNOR TO ALBERT W. WICKHAM, OF SAME PLACE.

INCRUSTATION PREVENTIVE.

SPECIFICATION forming part of Letters Patent No. 453,644, dated June 9, 1891.

Application filed February 28, 1891. Serial No. 383,266. (No specimens.)

*To all whom it may concern:*

Be it known that we, JOHN A. KASSEBAUM and MATTHEW D. DARR, citizens of the United States, residing at Salina, in the county of Saline and State of Kansas, have invented a new and useful Compound for Removing Incrustations from Steam-Boilers, of which the following is a specification.

The objects of our invention are to produce a compound which shall thoroughly and quickly remove all accumulations of scale or incrustations from steam-boilers, and also prevent the formation of such scale or incrustations; furthermore, to produce a compound which shall be inexpensive, and which shall be powerful in its action and capable of being effectively applied by persons unskilled in chemical arts, and, finally, to produce a compound which shall retain its strength for an indefinite length of time.

To the above purposes our invention consists in the novel compound hereinafter described and claimed.

Our compound consists of cornmeal, soda boras (borax), carbo-ligni (charcoal), and sal-soda; and the said ingredients are usually prepared in accordance with the following formula: cornmeal, one hundred pounds; sal-soda, seven and one-half pounds; soda boras, (borax,) two and one-half pounds; carbo-ligni, (charcoal,) one and one-fourth pound. These ingredients are thoroughly mixed together by agitation in a dry state, so as to form a dry compound, and when used the compound is placed in the water in the boiler without any previous treatment other than that above described, the proportion being varied according to the capacity of the boiler, and is approximately in the ratio of eight pounds for a forty-horse-power boiler. When so applied to the water in a scaly boiler, the compound impregnates the water and rapidly disintegrates the scale or incrustations and also dislodges and dissolves the same; and when the compound is similarly applied to a clean boiler it entirely prevents the formation of scale or incrustations. The glucose of the meal impregnates the water, while the charcoal, borax, and sal-soda break down and dissolve the scale and prevent the further formation of the same. No injury whatever results from the presence of the sal-soda, while this ingredient, acting with the others, also effectually prevents the formation of scale or incrustations.

It is obvious that no chemical skill is required in the application of the compound, and that it is inexpensive and will remain in good condition almost indefinitely.

Having thus described our invention, what we claim as our invention, and desire to secure by Letters Patent, is—

The herein-described compound for removing and preventing incrustations or scale in steam-boilers, the same consisting of a dry compound composed of cornmeal, sal-soda, soda boras, and carbo-ligni, in about the proportions specified.

JOHN A. KASSEBAUM.
MATTHEW D. DARR.

Witnesses:
   HENRY A. NORTHROP,
   S. GIESSEMAN.